(12) United States Patent
Liu et al.

(10) Patent No.: US 8,045,862 B2
(45) Date of Patent: Oct. 25, 2011

(54) OPTICAL COMMUNICATION METHOD AND APPARATUS

(75) Inventors: Xiang Liu, Marlboro, NJ (US); Yikai Su, Palatine, IL (US); Xing Wei, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1432 days.

(21) Appl. No.: 10/790,434

(22) Filed: Feb. 27, 2004

(65) Prior Publication Data

US 2005/0191061 A1    Sep. 1, 2005

(51) Int. Cl.
*H04B 10/02* (2006.01)
(52) U.S. Cl. .......................... 398/178; 398/160; 398/188
(58) Field of Classification Search .................... 398/18, 398/83, 94, 160, 178, 188
See application file for complete search history.

(56) References Cited

U.S. PATENT DOCUMENTS

| 6,091,743 A * | 7/2000 | Yang ................................. 372/6 |
| 6,400,479 B1 * | 6/2002 | Zhou et al. ...................... 398/92 |
| 7,116,908 B2 * | 10/2006 | Uda et al. ........................ 398/94 |
| 2002/0021861 A1 * | 2/2002 | Gnauck et al. ................. 385/24 |

FOREIGN PATENT DOCUMENTS

| EP | 0 373 945 A | 6/1990 |
| WO | WO 98/27674 | 6/1998 |
| WO | WO 00/41346 A | 7/2000 |

OTHER PUBLICATIONS

Wei et al., "10-GB/S RZ-DPSK Transmitter Using A Saturated SOA As A Power Booster And Limiting Amplifier", *IEEE Photonics Technology Letters*, vol. 16, No. 6, Jun. 2004, pp. 1582-1584.

Zirngibl et al., "Digitally Tunable Channel Dropping Filter/Equalizer Based on Waveguide Grating Router and Optical Amplifier Integration" *IEEE Photonics Technology Letters*, vol. 6, No. 4, Apr. 1, 1994, pp. 513-515.

Chi et al., "Optical Label Swapping And Packet Transmission Based on ASK/DPSK Orthogonal Modulation Formate in IP-Over WDM Networks", *Optical Fiber Communication Conference (OFC)*, vol. 2, Friday morning, Postconference Digest, Atlanta, GA, Mar. 23-28, 2003, pp. 792-794.

Yikai Su et al., "Wide Dynamic Range 10-Gb/s DPSK Packed Receiver Using Optical-Limiting Amplifiers", *IEEE Photonics Technology Letters*, vol. 16, No. 1, Jan. 2004, pp. 296-298.

P. S. Cho et al., "Suppression Of Cross-Gain Modulation In SOA Using RZ-DPSK Modulation Format", *IEEE Photonics Technology Letters*, vol. 15, No. 1, Jan. 2003, pp. 162-164.

K. Yiannopoulos et al., "Repetition Rate Upgrade For Optical Sources", *IEEE Photonics Technology Letters*, vol. 15, No. 6, Jun. 2003, pp. 861-863.

X. Wei et al., Optical $\pi/2$-DPSK And Its Tolerance To Filtering And Polarization-Mode Dispersion, *IEEE Photonics Technology Letters*, vol. 15, No. 11, Nov. 2003, pp. 1639-1641.

X. Liu et al., "Transmission of an ASK-Labeled RZ-DPSK Signal And Label Erasure Using A Saturated SOA", *IEEE Photonics Technology Letters*, vol. 16, No. 6, Jun. 2004, pp. 1594-1596.

X. Wei et al., "10-Gb/s RZ-DPSK Transmitter Using A Saturated SOA As A Power Booster and Limiting Amplifier", *IEEE Photonics Technology Letters*, vol. 16, No. 6, Jun. 2004, pp. 1582-1584.

* cited by examiner

*Primary Examiner* — Dzung D Tran
(74) *Attorney, Agent, or Firm* — Brosemer, Kolefas & Associates

(57) ABSTRACT

An optical amplification method and apparatus implemented using RZ-DPSK modulation or variants thereof and a deeply saturated semiconductor optical amplifier.

5 Claims, 5 Drawing Sheets $P_{in}$: -18 dBm  -10 dBm  -3 dBm  +4 dBm
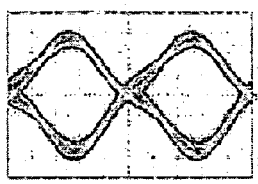 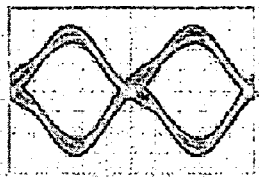 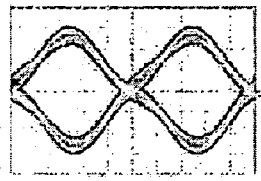 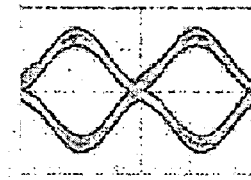
FIG. 4A      FIG. 4B      FIG. 4C      FIG. 4D
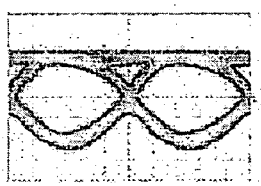 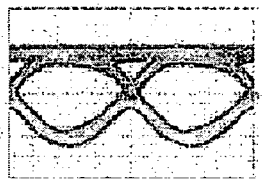 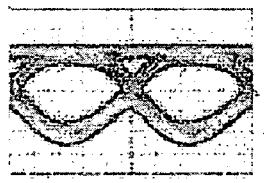 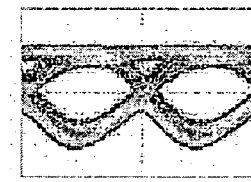
FIG. 4E      FIG. 4F      FIG. 4G      FIG. 4H
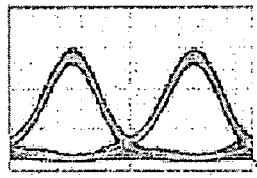  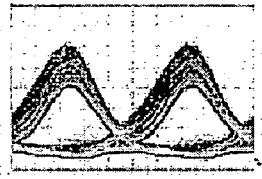 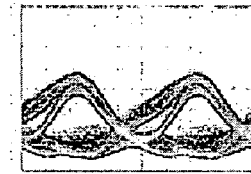
FIG. 4I      FIG. 4J      FIG. 4K      FIG. 4L
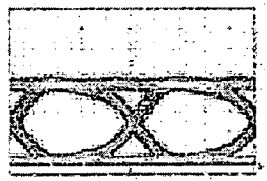 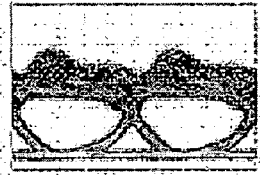 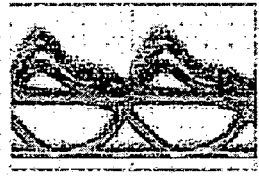 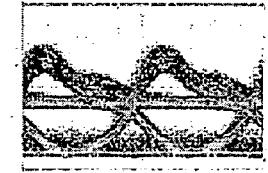
FIG. 4M      FIG. 4N      FIG. 4O      FIG. 4P

OPTICAL COMMUNICATION METHOD AND APPARATUS

FIELD OF THE INVENTION

The present invention relates to optical communications, and more specifically to a method and apparatus for processing and amplifying of optical signals using semiconductor optical amplifiers.

BACKGROUND OF THE INVENTION

An optical limiting amplifier is an optical amplifier that yields an output power which is insensitive to the variation of the input power. The gain of an optical limiting amplifier varies with the input power, and the response time is characterized by the gain recovery time of the optical amplifier. Examples of optical limiting amplifiers include deeply saturated erbium-doped fiber amplifier (EDFA) and deeply saturated semiconductor optical amplifier (SOA). The gain recovery time of a saturated EDFA is usually on the order of a millisecond, whereas the gain recovery time of a saturated SOA ranges from picoseconds to nanoseconds. Depending on the gain recovery time, the optical limiting amplifier may find a wide range of potential applications in optical communication systems. It can be used as a power equalizer at the optical transmitter to regulate the launch power; it can be used at optical add-drop nodes to suppress transient optical power fluctuations; it can be used as an optical preamplifier in front of a receiver to increase the receiver's power dynamic range; it can also be used to erase amplitude-shift keyed (ASK) optical labels on optically labeled signals. Since the gain dynamics of the EDFA is very slow, it is only good for suppressing slow power fluctuations at its input and not suitable for fast power equalization. The SOA, on the other hand, has much faster gain dynamics and is capable of regulating the optical power on a much smaller time scale. However, the use of a deeply saturated SOA as a power-limiting amplifier has been considered not practical because the gain recovery time of the SOA is comparable to the bit period and hence strong waveform distortion occurs when the SOA operates in the deep saturation regime with the conventional on-off keying (OOK) optical signals.

Novel modulation schemes have been considered to improve the performance of saturated SOAs. Recently, significant reduction of cross-gain modulation in the SOA was successfully demonstrated for wavelength-division multiplexed (WDM) transmission with return-to-zero differential phase-shift keying (RZ-DPSK), see P. S. Cho and J. B. Khurgin, "Suppression of cross-gain modulation in SOA using RZ-DPSK modulation format," *IEEE Photon. Technol. Lett.*, vol. 15, pp. 162-164, 2003. However, no prior art schemes have proposed employing a deeply saturated SOA as an optical power limiting amplifier to rapidly equalize the power of an optical signal.

SUMMARY OF THE INVENTION

The present invention provides a method for optical amplification. The method includes generating a phase-shift keyed optical signal and propagating the optical signal through a semiconductor optical amplifier in deep saturation to automatically adjust, limit or regulate the amplified optical power to a predetermined or desired level, (e.g. the saturation output power of the SOA).

A channel power equalizer is also provided including a demultiplexer for demultiplexing an optical signal comprising a plurality of channels employing phase-shift keying, a multiplexer for multiplexing the plurality of optical channels, and a plurality of semiconductor optical amplifiers coupled to the demultiplexer and the multiplexer and adapted to provide optical power equalization of the plurality of channels.

BRIEF DESCRIPTION OF THE DRAWING

FIGS. 4a-p show the eye diagrams of received optical signals of different modulation formats at various input powers;

DETAILED DESCRIPTION OF THE INVENTION

Figure 1:
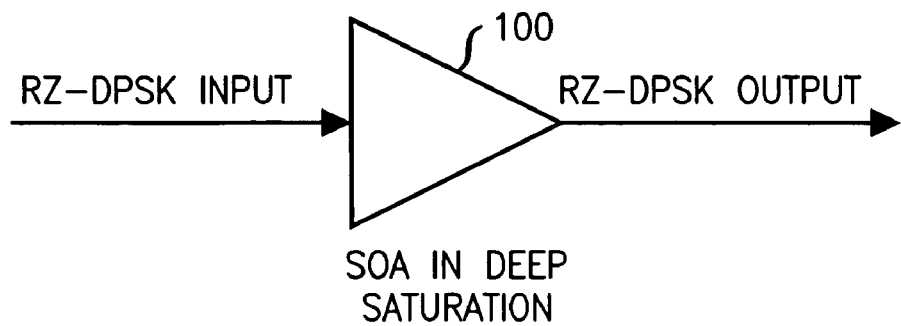
FIG. 1 is a diagram showing an SOA in accordance with aspects of the present invention.

The present invention provides a method and apparatus for processing and amplifying of optical signals using semiconductor optical amplifiers (SOA). FIG. 1 shows a semiconductor optical amplifier according to aspects of the invention. A deeply saturated semiconductor optical amplifier (SOA) 100 is used to amplify an input optical signal that is a return-to-zero differential phase-shift keying signal (RZ-DPSK). The RZ pulses preferably have a duty cycle of 50% or less. The bit rate is typically 10 Gb/s (or 40 Gb/s), which corresponds to a bit period of 100 ps (or 25 ps). The SOA preferably has a gain recovery time that is larger than the bit period.

According to the teachings of the prior art, it is understood that SOAs operating in the deep saturation regime perform poorly with conventional on-off keying (OOK) signals, resulting in severe waveform distortions or pattern effects due to the fast gain dynamics of the SOA. However, according to aspects of the present, a deeply saturated SOA is used to provide efficient optical power amplification and/or power equalization of RZ-DPSK signals.

Unlike conventional OOK signals, a DPSK signal encodes the binary information in the relative phase-shift between two adjacent light pulses, for example, a digital "1" is represented by a π phase-shift and a digital "0" is represented by no phase-shift. Consequently, the intensity profile of an RZ-DPSK signal is independent of the binary information it carries (i.e. a data independent intensity profile), and the pattern effect in an SOA can be eliminated even in the deep saturation regime.

It is to be understood that the present invention can be applied using other modulation formats including, for example, the DPSK variant known as π/2-DPSK, regardless of RZ or NRZ, while providing the same advantages of data-independent intensity profile signals (see X. Wei, et al., "Optical π/2-DPSK and its tolerance to filtering and polarization-mode dispersion", IEEE Photonics Technology Letters, Vol. 15, pp. 1639-1641, 2003, which is incorporated herein by reference). Another modulation format with a data-independent intensity profile, which may be use in accordance with the present invention is return-to-zero differential quadrature phase-shift keying (RZ-DQPSK).

Figure 2:
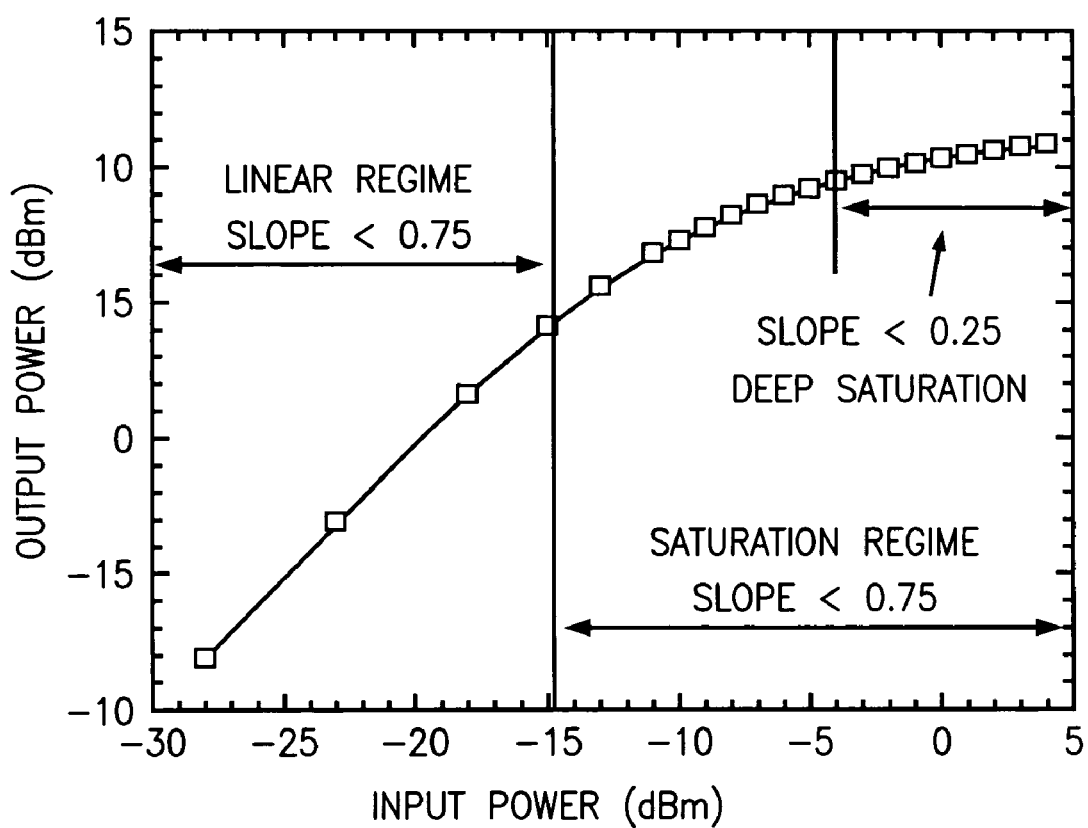
FIG. 2 is a plot showing gain saturation characteristics of an SOA.

"Deep saturation", as used herein, is discussed below with regard to specific embodiments. FIG. 2 shows the output power vs. input power characteristics of an SOA that was used in an experimental demonstration of aspects of the present invention. The SOA was a commercial unit with a gain recovery time of approximately 200 ps. The driving current was set to 200 mA. The input signal was RZ-DPSK. (Additional details of the experimental demonstration are discussed below.)

The gain of the SOA is 20 dB in the small-signal regime, and it drops by ~3 dB when the input power increases to −10 dBm. As shown in FIG. 2, the slope in the $P_{out}$(dBm) vs. $P_{in}$(dBm) plot was used to quantify the degree of saturation. The regime in which the $P_{out}$(dBm) vs. $P_{in}$(dBm) slope is larger than 0.75 will be called the linear regime; the regime in which the $P_{out}$(dBm) vs. $P_{in}$(dBm) slope is smaller than 0.75 is referred to herein as the saturation regime; and the regime in which the $P_{out}$(dBm) vs. $P_{in}$(dBm) slope is smaller than 0.25 is referred to herein as the deep saturation regime. In the example shown in FIG. 2, $P_{in}$<−15 dBm is the linear regime, $P_{in}$>−15 dBm is the saturation regime, and $P_{in}$>−4 dBm is the deep saturation regime.

In the deep saturation regime −4 dBm<$P_{in}$<4 dBm (total power variation of 8 dB), the variation of SOA output power is less than 2 dB. According to aspects of the invention, limiting amplification is provided through suppression of the output power variation in the deep saturation regime of an SOA.

Figure 3:
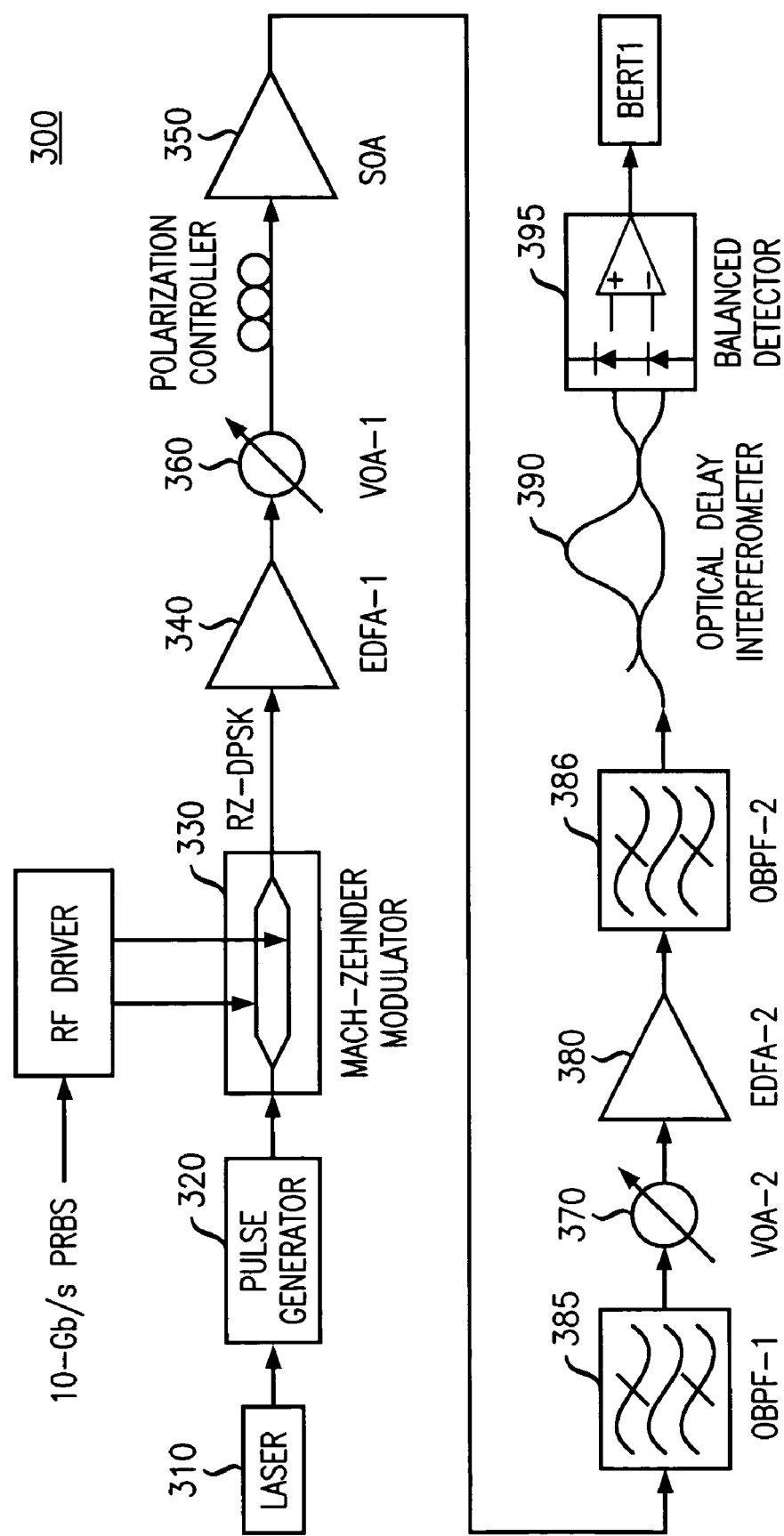
FIG. 3 is a schematic diagram of an experimental setup of an optical communication system in accordance with aspects of the invention.

FIG. 3 shows the experimental apparatus 300 that was used to demonstrate the performance of an SOA as a limiting amplifier for RZ-DPSK transmitter in accordance with an embodiment of the present invention. Those skilled in the art will appreciate that the experimental apparatus 300 can be modified to test other modulation formats, such as, NRZ-DPSK, RZ-OOK, and NRZ-OOK for comparison. (For NRZ-DPSK and NRZ-OOK, the pulse generator is bypassed. For OOK, the driver voltage and bias of the Mach-Zehnder modulator need to be adjusted and the optical delay interferometer and balanced detector are replaced with a regular detector.)

The apparatus 300 was used to study RZ-DPSK, NRZ-DPSK, RZ-OOK, and NRZ-OOK signals. The laser 310 was a tunable laser operating at 1550 nm. The pulse generator 320 produced chirp-free optical pulses with a repetition rate of 10 GHz and a duty cycle of 50%. The Mach-Zehnder modulator 330 was driven with a 10-Gb/s pseudo-random bit sequence (PRBS) of length $2^{31}$−1. EDFA-1 340 was used to amplify the signal power to reach the deep saturation regime of the SOA 350. The optical signal-to-noise ratio (OSNR) of the SOA 350 input signal was higher than 35 dB (defined with 0.1-nm bandwidth for the noise power), therefore the effect of the amplified spontaneous emission (ASE) noise produced by EDFA-1 340 could be neglected. The signal power at the SOA 350 input was varied between −28 dBm and 4 dBm by adjusting the variable optical attenuator VOA-1 360. VOA-2 370 and EDFA-2 380 were used to measure the receiver sensitivity of the SOA 350 output signals. The VOAs 360,370 had built-in optical power meters to monitor the power levels. The optical bandpass filters OBPF-1 385 and OBP-2 386 had 3-dB bandwidths of 0.6 nm and 0.8 nm, respectively. An optical delay interferometer 390 with a 100-ps delay and a balanced detector 395 were used to detect the DPSK signals.

FIGS. 4a-p show the eye diagrams of the received signals of RZ-DPSK, NRZ-DPSK, RZ-OOK, and NRZ-OOK (a-d, e-h, i-l, and m-p respectively) with four different power levels at the input of the SOA 350. The SOA 350 input powers ($P_{in}$) are indicated above the eye diagrams.

To measure these eye diagrams, the power level at the input of EDFA-2 380 was set relatively high (−20 dBm) to avoid OSNR degradation. As discussed above, RZ-OOK and NRZ-OOK show strong pattern effect with high input powers. The large "noise" on the zero rail of OOK is due to the fact that the "0"s experience much higher gain than the "1"s. In comparison, RZ-DPSK was found to have a distinct advantage in the deep saturation regime, showing almost no distortion in the received eye diagram.

Figure 5:
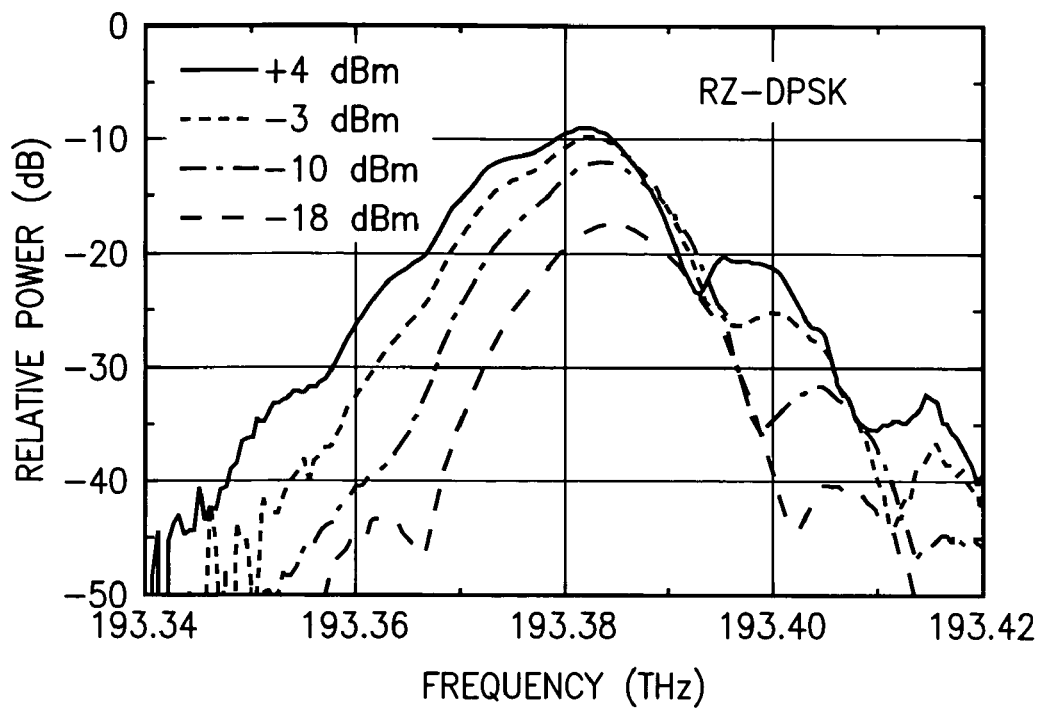
FIG. 5 shows an optical power spectra at the output of an SOA with different SOA input power levels.

The RZ shape in the RZ-DPSK diagrams is unchanged even with deep saturation. It was understood that that this is due to having the SOA gain recovery time (200 ps in the experiment) that was longer than one bit period, and consequently, the gain does not change rapidly across one bit slot even though the SOA 350 was deeply saturated. This introduces some chirp to the pulses, as indicated by the broadening of the optical power spectra shown in FIG. 5. However, since the chirp introduced to the pulses is identical from pulse to pulse, and since essentially only the phase difference between two adjacent pulses determines the data encoded by the RZ-DPSK signal, the impact from the saturation-induced chirp on the performance of RZ-DPSK is minimal.

Figure 6:
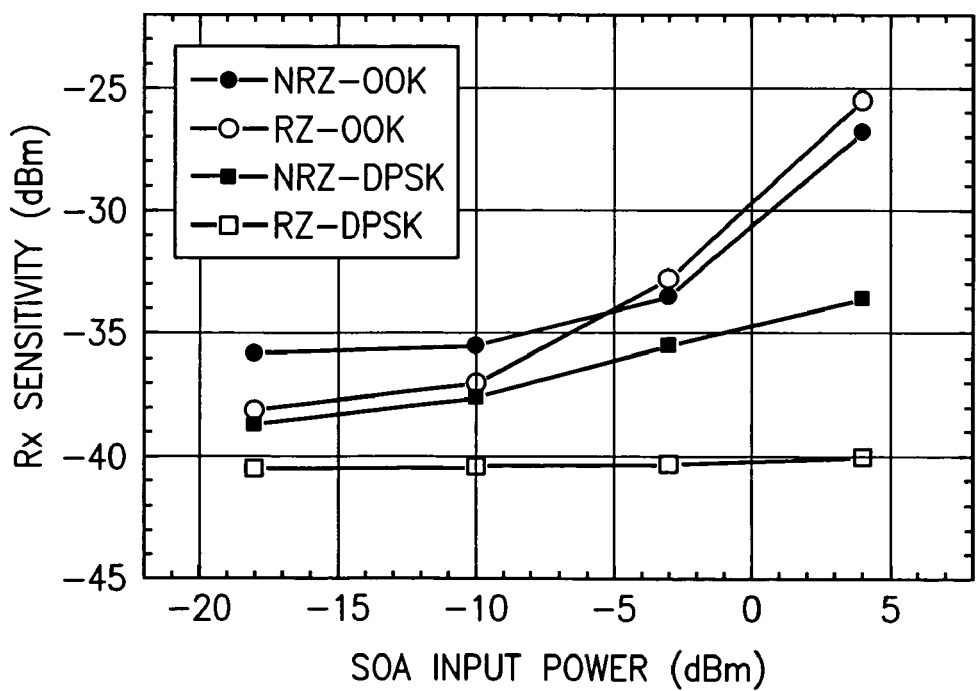
FIG. 6 shows measured receiver sensitivities of different modulation formats at various SOA input power levels.

FIG. 6 shows the measured receiver sensitivities (input power to EDFA-2 380) corresponding to the 16 conditions for the eye diagrams in FIG. 4. The bit error rate (BER) was $10^{-9}$. The receiver sensitivity of RZ-DPSK was effectively independent of the degree of saturation of the SOA 350, whereas all other formats suffer significant degradation when the SOA 350 is strongly saturated. This is consistent with the eye diagram observations and confirms that saturated SOAs can be used in RZ-DPSK transmitters with negligible degradation in performance.

Figure 7:
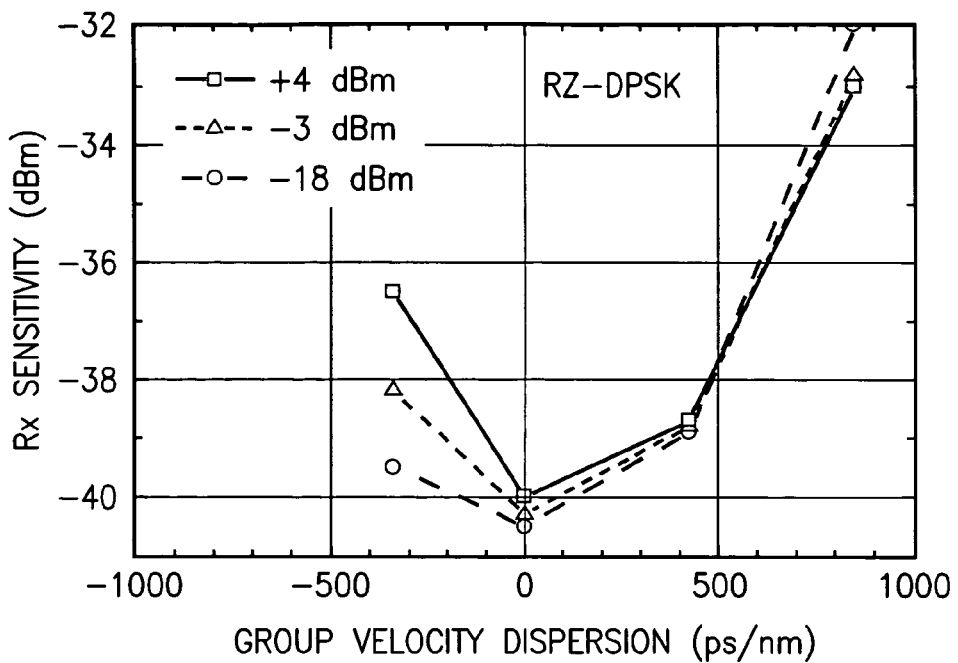
FIG. 7 shows the measured receiver sensitivities of the RZ-DPSK signal amplified by the SOA with input powers of −18 dBm, −10 dBm, −3 dBm, and +4 dBm.

It is understood that the chirp induced by a saturated SOA in an RZ-DPSK signal may affect the dispersion tolerance of the signal to some extent. To quantify this effect an SOA output signal was transmitted over standard single mode fiber (SMF) and dispersion compensating fiber (DCF) of different lengths using the experimental apparatus 300 of FIG. 3. The fiber was inserted between the SOA 350 and OBPF-1 385. The optical power launched into the fiber was attenuated to below 0 dBm to ensure that self-phase modulation (SPM) would not occur. The measured receiver sensitivities against group velocity dispersion (GVD) are shown in FIG. 7, which shows the impact of chirp from the saturated SOA is small. The saturation-induced chirp mainly shifted the optimal residual dispersion from zero to a positive value in this experimental demonstration.

In one embodiment of the present invention a deeply saturated SOA is used in an RZ-DPSK (or its variants) transmitter (not shown) as an efficient power booster amplifier. The deep saturation also helps to regulate the final output power from the SOA against the variations of the connector and modulator losses in various stages in the transmitter.

Figure 8:
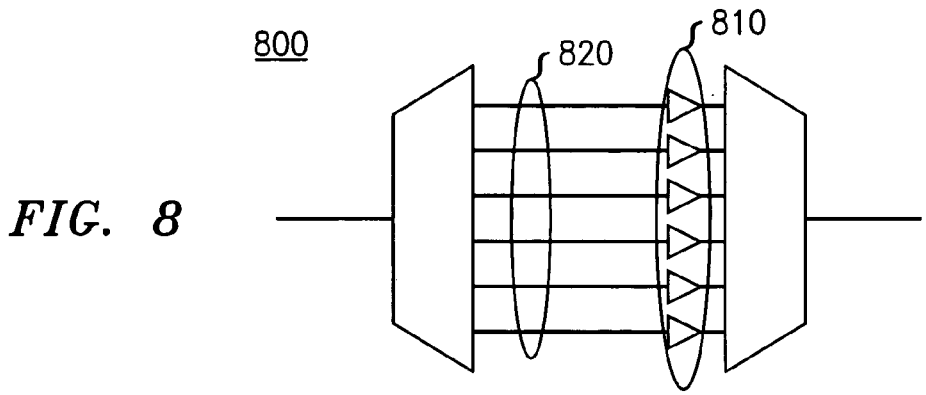
FIG. 8 is a diagram of an embodiment of a gain equalizer according to the invention.

In another embodiment of the present invention shown in FIG. 8, a plurality of deeply saturated SOAs 810 are used as a channel power equalizer to provide optical power equalization of a plurality of channels 820.

Figure 9:
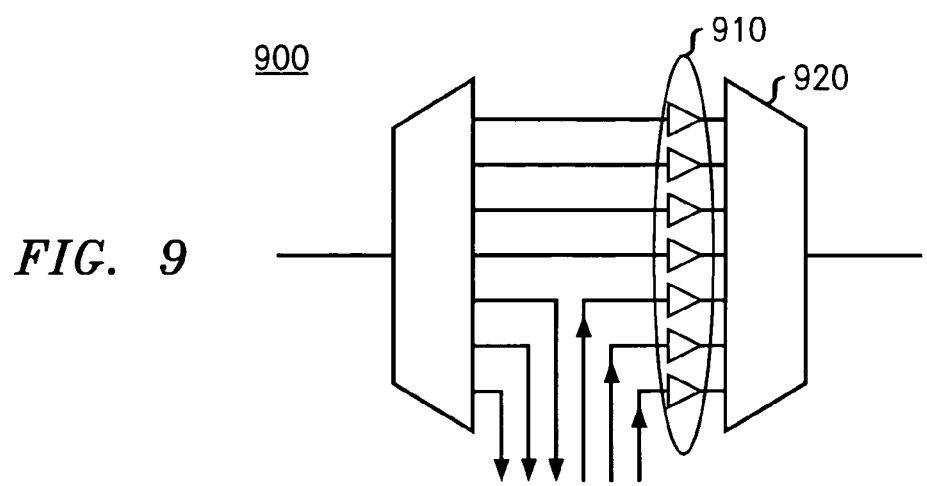
FIG. 9 is a diagram of an embodiment of an optical add/drop multiplexer with power equalization function according to the invention.

In another embodiment of the present invention shown in FIG. 9, a plurality of deeply saturated SOAs 910 are used in an optical add-drop node 900 to suppress transient optical power fluctuations of the signals being multiplexed by multiplexer 920.

It is also understood that the present invention could also be applied to an RZ-DPSK receiver to improve the receiver power dynamic range. Further the present invention can also be used to erase amplitude-shift keyed (ASK) optical labels on optically labeled RZ-DPSK signals.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as defined by the appended claims.

Although the steps of various methods according to the invention are disclosed and discussed with reference to a particular sequence, the present invention is not limited to methods implementing some or all of those steps in those particular sequences.

We claim:

1. A method comprising:
   generating a phase-shift keyed optical signal; and
   propagating the phase shift keyed optical signal through a semiconductor optical amplifier in deep saturation, wherein $-4dBm<P_{IN}<4dBm$, such that an optical signal exhibiting a regulated, amplified optical power is produced;
   wherein the amplified optical power is regulated to a saturation output power such that $\Delta P_{OUT}(dB)/\Delta P_{IN}(dB)$ of the optical amplifier is less than about 0.25, wherein $P_{OUT}$ is the power of the optical signal output from the amplifier, and $P_{IN}$ is the power of the optical signal input into the amplifier.

2. A method for optical limiting amplification comprising:
   inputting a phase-shift keyed optical signal having a data independent intensity profile into a semiconductor optical amplifier in a deep saturation regime wherein $-4dBm<P_{IN}<4dBm$ such that an optical signal exhibiting a regulated, amplified optical power is produced and output, wherein $\Delta P_{OUT}(dB)/\Delta P_{IN}(dB)$ is less than 0.25, where $P_{OUT}$ is the power of the optical signal output from the amplifier, and $P_{IN}$ is the power of the optical signal input into the amplifier.

3. An optical signal processor apparatus comprising:
   a semiconductor optical amplifier device adapted to operate in deep saturation wherein $-4dBm<P_{IN}<4dBm$ and to receive an RZ-DPSK optical signal having an amplitude-shift keyed optical label portion, such that the optical label portion of the signal is removed upon propagation through the semiconductor optical amplifier device;
   wherein $\Delta P_{OUT}(dB)/\Delta P_{IN}(dB)$ is less than 0.25, where $P_{OUT}$ is the power of the optical signal output from the amplifiers, and $P_{IN}$ is the power of the optical signal input into the amplifiers.

4. An optical communication system for transmitting multi-channel phase-shift keyed optical signals comprising:
   a plurality of semiconductor optical amplifiers,
   wherein the system is adapted to transmit the optical signals such that the plurality of semiconductor optical amplifiers operate in a deep saturation regime wherein $-4dBm<P_{IN}<4dBm$ so as to provide optical power equalization of a plurality of channels of the multi-channel optical signals,
   wherein $\Delta P_{OUT}(dB)/\Delta P_{IN}(dB)$ is less than about 0.25, where $P_{OUT}$ is the power of the optical signal output from the amplifiers, and $P_{IN}$ is the power of the optical signal input into the amplifiers.

5. An apparatus comprising:
   a means for generating a phase-shift keyed optical signal; and
   a means for propagating the optical signal through a semiconductor optical amplifier in deep saturation wherein $-4dBm<P_{IN}<4dBm$ to regulate the amplified optical power;
   wherein $\Delta P_{OUT}(dB)/\Delta P_{IN}(dB)$ is less than 0.25, where $P_{OUT}$ is the power of the optical signal output from the amplifiers, and $P_{IN}$ is the power of the optical signal input into the amplifiers.

* * * * *